Jan. 28, 1930.　　　　M. ALPERN　　　　1,745,238
AUTOMATIC FLUID CONTROL SYSTEM
Filed March 19, 1928　　8 Sheets-Sheet 1

Fig.1

Inventor:—
Maxwell Alpern.
by his Attorneys.
Howson & Howson

Jan. 28, 1930.　　　　　M. ALPERN　　　　　1,745,238
AUTOMATIC FLUID CONTROL SYSTEM
Filed March 19, 1928.　　8 Sheets-Sheet 3

Inventor:
Maxwell Alpern.
by his Attorneys.
Howson & Howson

Fig. 7.

Patented Jan. 28, 1930

1,745,238

UNITED STATES PATENT OFFICE

MAXWELL ALPERN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

AUTOMATIC FLUID-CONTROL SYSTEM

Application filed March 19, 1928. Serial No. 262,935.

This invention relates to systems employed in the handling of fluids, in either a gaseous or liquid state, and comprises means for controlling the flow of such fluids in passing through the said systems.

The invention involves a fundamental principle of fluid control which is adaptable to a wide and varied scope of utility, including the regulation of either a natural or a forced draft in furnaces, boilers, etc.; the regulation of the flow of air in the various branches of ventilating systems; the regulation of the volume of air delivered to the different supply ducts of pipe organs, pneumatic conveying apparatus, hot air heating systems and other air or gas supply systems.

The main principle of the invention is also applicable to steam, vapor or hot water heating systems, steam, oil and water supply systems, and hydraulic systems employing oil, water or other liquid as an operating medium for various devices.

The principle involved, which forms the subject of my invention, is applicable to and is equally efficient in fluid systems operating under either pressure or vacuum, and comprises the utilization of the resistance, or the lack of resistance as the case may be, which is presented to the flow of fluid at a given point in the system as a means for actuating a mechanical controlling device by which the said flow is regulated at that particular point in the system and, if desired, at other points throughout the system.

For example, in a ventilating system, or a hot air heating system, comprising a main duct having a plurality of branch ducts communicating therewith and each branch opening into a different room of a building, and considering all the windows in all the rooms as being closed, a substantially equal volume of air may be supplied to each room, or in proportion with the cubical content of the room. The inert air in the closed rooms will present a certain amount of resistance to the air delivered thereto by the respective branch ducts. Should a window in one of the rooms subsequently be opened the amount of resistance presented to the air leaving the branch duct in that particular room would be somewhat reduced, therefore, the flow of air into that particular room would increase and consequently the volume of air delivered to the other rooms would be proportionately reduced.

According to the principle on which my invention is based, the reduction of the amount of resistance at the one point in the system, such as a room, will function in a manner to operate the mechanical means which controls the flow of air to that particular point in the system, consequently the flow of air to that particular point will be reduced in accordance with the reduction of the amount of resistance offered. By this means the other rooms will continue to receive their proportionate volumes of air. If desired, the mechanical controlling means, for the air entering the different rooms through the respective branch ducts, may be balanced or interconnected so that a reduction of the flow at one point in the system will automatically react to increase the flow to the other points proportionately.

The principle also operates in a reverse order i. e. if the amount of resistance to the flow increases at any given point in the system, such a condition will cause the mechanical controlling means to operate in a manner to permit an increased flow at the particular point in the system which has been subjected to the increased resistance.

Obviously this principle is applicable to other forms or types of air or other gaseous fluid supply systems, such as those used in pipe organs, pneumatic conveyers, etc.

The principle involved is equally applicable to steam, oil and water supply systems having a main trunk and a series of branches leading therefrom. If the flow in any one of the branch ducts increases or decreases, due to a variation in the resistance presented to the flow in that particular branch, the flow thereto will be automatically and inversely regulated in accordance with the resistance variation therein.

This principle is also applicable to hydraulic systems in which a plurality of hydraulically operated devices are supplied with motive fluid from a common source, wherein the control device would operate in a manner similar to that just described.

The invention may also be applied to the governor of an engine or turbine for regulating the flow of operating fluid thereto, or it may be employed in applying a balance for any of the commonly used forces such as springs and weights, either variable or fixed.

In general, the invention is applicable to any fluid supply system, employing either gaseous or liquid fluid, either under pressure or vacuum, and comprises a device for automatically controlling the flow of such fluid in any predetermined ratio and in inverse proportion to the resistance offered to such flow.

Each of the mechanical controlling devices is provided with an operating motor which is actuated by differential pressures created in the said device by the resistance offered to the flow passing through the device, said motor being connected to dampers, valves or some other form of flow controlling device for effecting a regulation of the flow through the portion of the system to which said mechanical controlling device is connected. As above noted, the operating motors, the dampers or the valves throughout the system may be interconnected in such a manner that the operation of one of said devices will effect operation of the other devices in a ratio proportionate to their members.

For the purpose of illustrating a specific application of the invention, I have chosen the furnace showing a system for supplying a forced draft, in the present instance, to a stoker of the under-feed type, generally known as the Taylor stoker. In this type of boiler the coal is fed to the bed of the fire by suitable rams and pushers, and air under pressure is supplied, for the purpose of aiding combustion, through a series of tuyères arranged in banks, alternating with the said rams and pushers. The air is supplied by a suitable blower to a chamber underlying the pushers and the tuyères, which is commonly designated as the wind-box, the air passing from the wind-box through suitable apertures in the tuyères, and combining with the gases emanating from the heated coal for the purpose of properly effecting combustion.

In the operation of this type of stoker, there are times when the coal-feeding apparatus fails to uniformly distribute the coal over the adjacent tuyères, some portions of the fuel bed are consequently thin and other portions comparatively dense. Obviously, these different portions of the fuel bed will present a resistance to the draft which will vary in accordance with the density of the fuel bed in these different areas. The thin areas offering the least resistance to the draft of the fuel bed have a tendency to burn through more quickly than the dense areas, permitting an excessive rush of air through these thin portions of the fuel bed and thereby causing a reduction in the amount of air accessible at the dense areas. The excessive rush of air at the thin areas causes a quick burning of the fuel and an abnormal and extremely high temperature to develop at these places, which consequently causes the tuyères to burn out, requiring the boiler to be placed out of operation while the burned out tuyères are being replaced. In the dense area of the fuel bed, not receiving a sufficient amount of air, the fuel is not properly consumed, resulting in an unevenly burning fire, which is quite unsatisfactory.

In applying my invention to a boiler of the above mentioned type, the fire bed is theoretically divided into a plurality of areas and a draft-controlling device is provided for each of these areas, between the fuel bed and the wind-box of the furnace.

Assuming that the air pressure in the wind-box is substantially uniform throughout, under the uneven condition of the fuel bed above noted, there would exist the tendency for the air to rush through the portions of the fuel bed presenting the least resistance to the draft, with a consequent reduction of the flow of air through the more densely packed areas of the fuel bed which present the greater resistance to the draft and which should receive the greater amount of air.

With my invention, the mechanical control devices of the different areas will be actuated, by the flow of air to the respective areas, in such a manner, governed by the amount of resistance presented in the respective areas, as to cause the flow of air to the thinly covered areas of the fuel bed to be reduced and the flow to the densely covered areas to be increased, resulting in an evenly burning fire, and eliminating the possibilities of burning out the tuyères.

In the illustrated adaptation of the principles of my invention, the mechanical controlling devices are interconnected in such a manner that operation of one of said devices will cause a reverse actuation of others of the series of controlling devices, thus, when some of the devices actuate to cause a reduction of the air flow to their respective areas of the fuel bed, they will assist in the actuation of the other devices to increase the flow of air to their respective areas of the fuel bed.

This interconnecting of the control devices is not absolutely essential as each device is capable of operating independently, to control the amount of air passing to the area of the fuel bed which it is adapted to control.

The details of the construction of the particular adaptation of the principles of my invention will be more fully disclosed hereinafter, reference being had to the accompanying drawings, of which.

Figure 1:
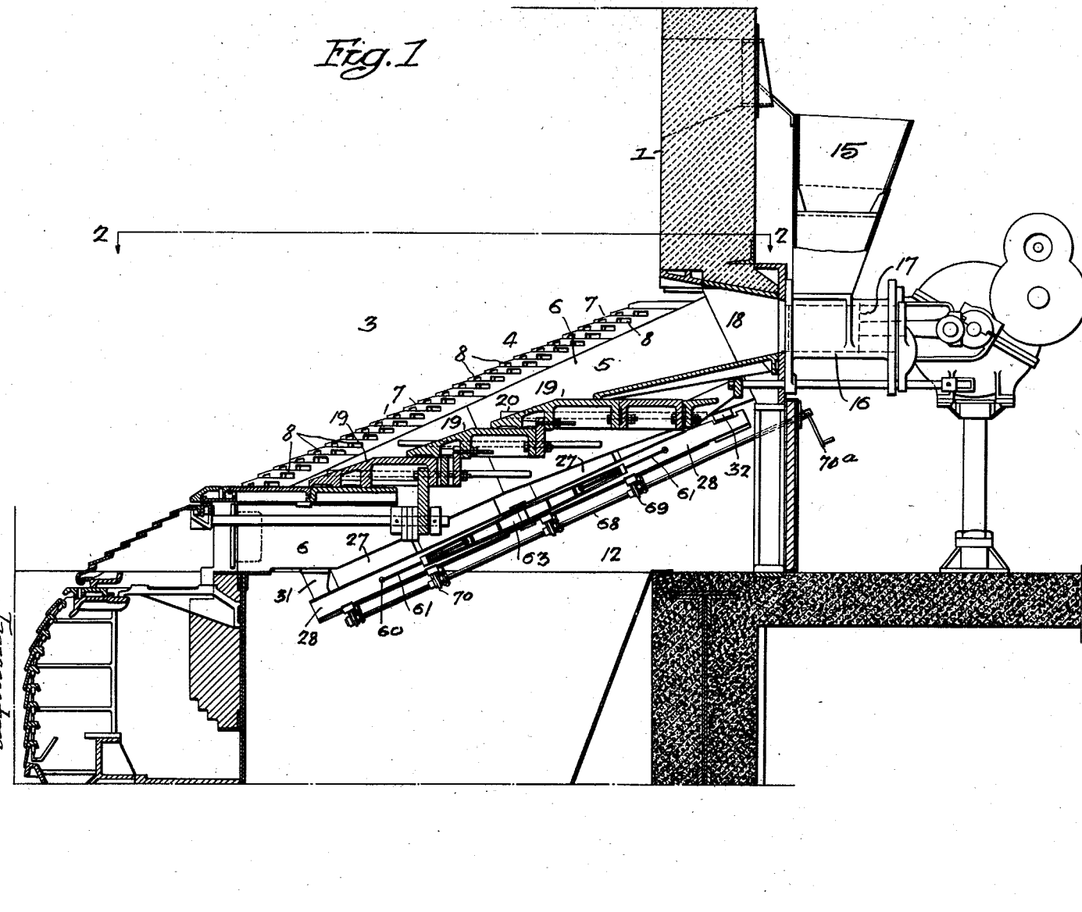
Fig. 1 is a longitudinal sectional elevation through the coal-feeding apparatus of a furnace embodying the features of my invention.
Figure 2:
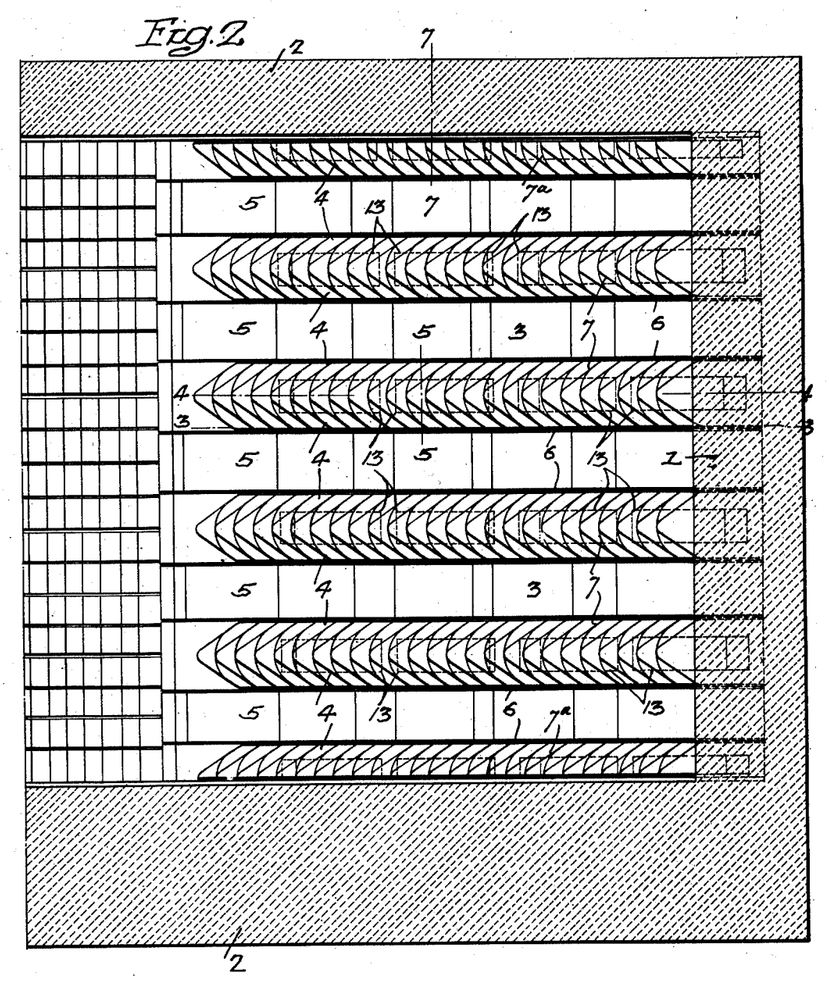
Fig. 2 is a sectional plan view taken along the line 2—2 of Fig. 1, and illustrating the arrangement of tuyères and coal pushers.
Figure 3:
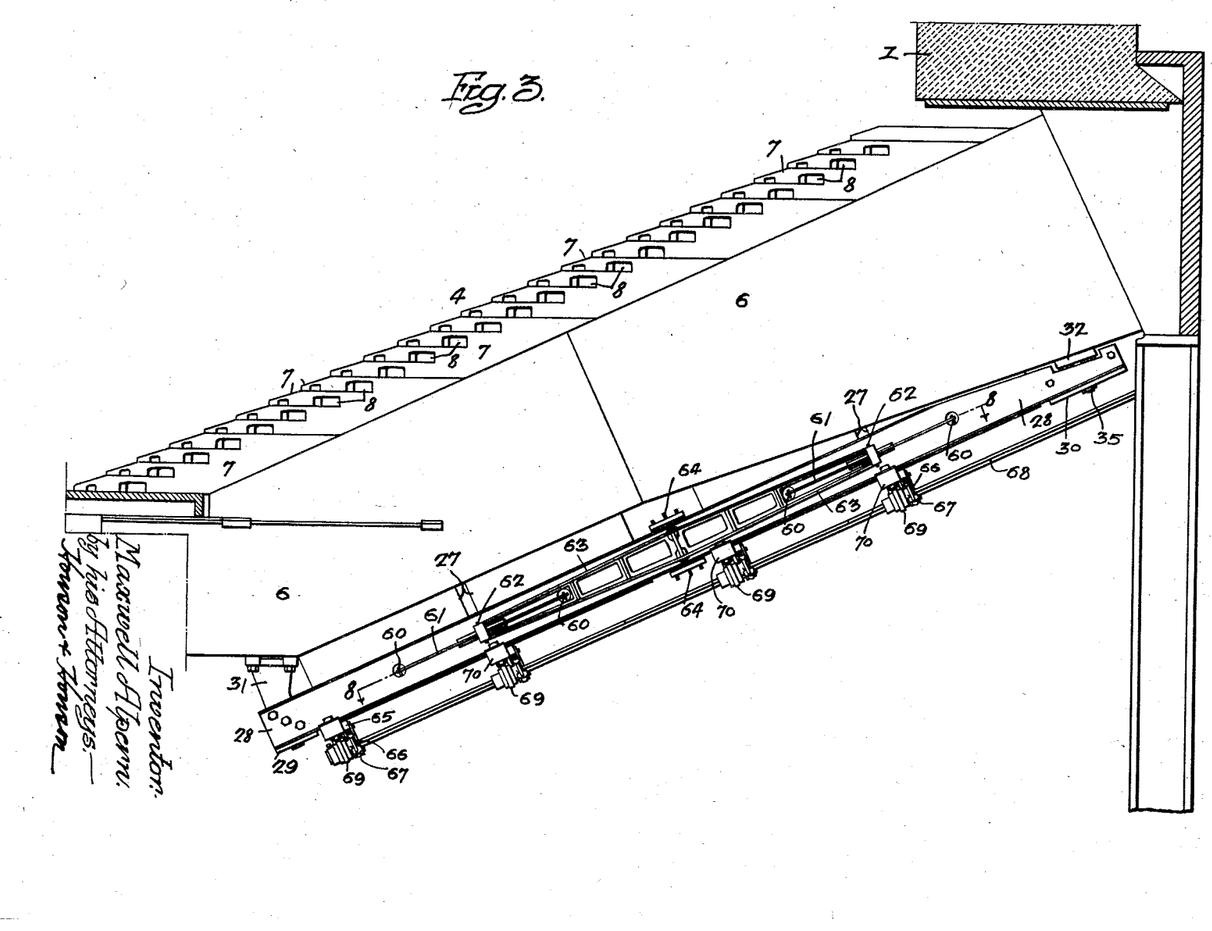
Fig. 3 is a longitudinal sectional elevation taken along the line 3—3 of Fig. 2, illustrating a tuyère bank in side elevation, and my improved controlling apparatus applied thereto.

As illustrated in Figs. 1 and 2, the furnace selected for the purpose of illustrating my invention comprises a front wall 1, and side walls 2, 2, defining the fire bed space generally indicated at 3, within which is suitably mounted a series of tuyère banks 4, the individual banks alternating with coal feeding units or retorts 5. Each of the tuyère banks comprises a pair of side walls 6, 6 suitably mounted in the furnace, each bank comprising a series of tuyère units 7, 7 of the usual construction and comprising air outlets 8, which communicate with an air passage 9 formed within the tuyère units.

Figure 4:
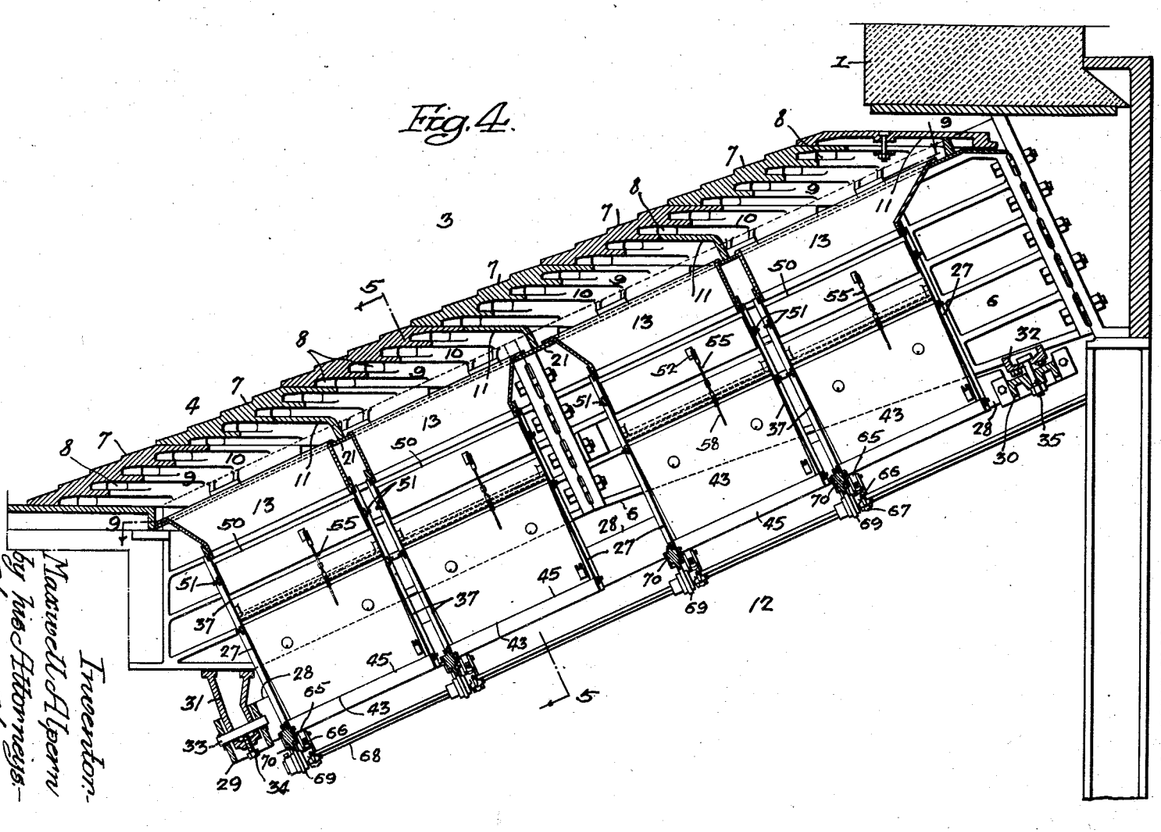
Fig. 4 is a longitudinal section elevation through the tuyère bank taken along the line 4—4 of Fig. 2.

As illustrated in Fig. 4, the air passage 9 is divided into sub-chambers 10 by means of partitions 11 suitably formed in or attached to the tuyère units 7 at the desired points. Each of the air chambers 10 communicates with the wind-box 12 of the furnace through and by means of an air nozzle 13, each of which is suitably connected to a controlling mechanism for the air passing therethrough, which will be more fully described hereinafter.

Each of the coal feeding units or retorts 5 comprises the usual fuel hopper 15 which communicates with a cylinder 16 provided with a ram 17, which is adapted to be reciprocated by any suitable means to force the coal, which passes from the hopper 15 into the cylinder 16, by gravity, out of the cylinder 16 into the coal passage 18 formed between the side plates 6, 6 of each pair of tuyère banks 4.

Suitably mounted between the said side plates 6 is a series of coal pushers 19, 19 adapted to be reciprocated upon rails 20 formed on the said side plates in the usual manner. The pushers 19, 19 are suitably connected with a mechanism which reciprocates the ram 17 and co-operates therewith to move the coal outward through the passage 18 and up and over the tuyère bank at each side thereof.

Each tuyère bank 4 includes a plate 21 which is secured at each of its sides to a flange 22, formed integral with the side plates 6, 6. Each tuyère unit 7 is provided at each side with a foot 23. Bolts 24, 24 pass through the plate 21, flanges 22 and feet 23, by means of which these three elements are secured together.

Each of the air nozzles 13 is secured to the plate 21 by bolts 25, and passes downward through an aperture 26 formed in the plate 21. A control box 27 is provided between each of the air nozzles 13 and the wind-box 12 of the furnace, by means of which the amount of air passing from the wind-box to the air nozzle may be accurately and automatically controlled.

The series of control boxes for each tuyère bank 4 is suitably mounted upon a pair of longitudinally extending supporting beams 28, 28 which are connected at their opposite ends by transversely extending members 29 and 30. Extending between and suitably secured to the side plates 6, 6 of each tuyère bank is a pair of transverse supporting members 31 and 32. The transverse member 29 is horizontally pivoted to the transverse member 31 by a short shaft 33 secured within the member 31 by a set screw 34, in the present instance. The transverse member 30 is vertically pivoted to the transverse member 32 by a pivot bolt 35, as illustrated in Fig. 4.

The upper end of each of the control boxes 27 engages the lower end of the respective air nozzle 13, but is not rigidly secured thereto, permitting relative movement between these two elements. On furnaces employing the above described construction, warping or misalignment of the side plates 6 will not affect the alignment or operation of the movable elements contained in the control boxes 27, due to the fact that the frame on which the control boxes are mounted which comprises the side beams 28, 28 and the transverse connecting members 29 and 30, is supported at but two points on the side plates. Distortion of the side plates and tuyères 7 is more or less common in this type of furnace, due to the heat of the fire bed, the control boxes being in direct communication with the wind-box of the furnace remain comparatively cool thereby eliminating distortion of these elements, and by mounting the control boxes in a manner as above described, relative movement between the control boxes and nozzles is permitted without affecting the operation of the mechanism of the control boxes.

Each control box 27 comprises side walls 36, 36 and end walls 37, 37, and is divided into a damper or delivery chamber 38 and a motor or receiving chamber 39, by a rail 40 secured to each of the side walls 36, 36. Each rail 40 is provided with a downwardly extending flange 41, whereby a throat 42 is formed between the upper and lower chambers.

Within the lower chamber 39 of the control box 27 is a pair of motor elements 43, 43 which are pivoted at 44, 44 in each of the end walls 37, 37. A lower rail 45 is suitably mounted in the lower portion of the chamber 39 and at each side thereof, immediately below each of the motor elements 43. A lever 46 is pivoted intermediate its ends, to one of the end walls 37, and a pair of links 47, 47 is provided, each link having one of its ends pivoted to one end of the lever 46 and its opposite end pivoted to one of the motor elements 43, at a point 48.

In the upper or damper chamber is provided a pair of balanced dampers 50, 50 pivoted at 51, 51 in each of the end walls 37, 37. Each damper is provided with a lug 52 to which is pivotally connected, at 54, one end of a connecting rod 55, the opposite end of which is pivotally connected at 57 to a bracket 58 secured to the motor element 43 underlying the particular damper with which it co-operates.

Figures 5, 11:
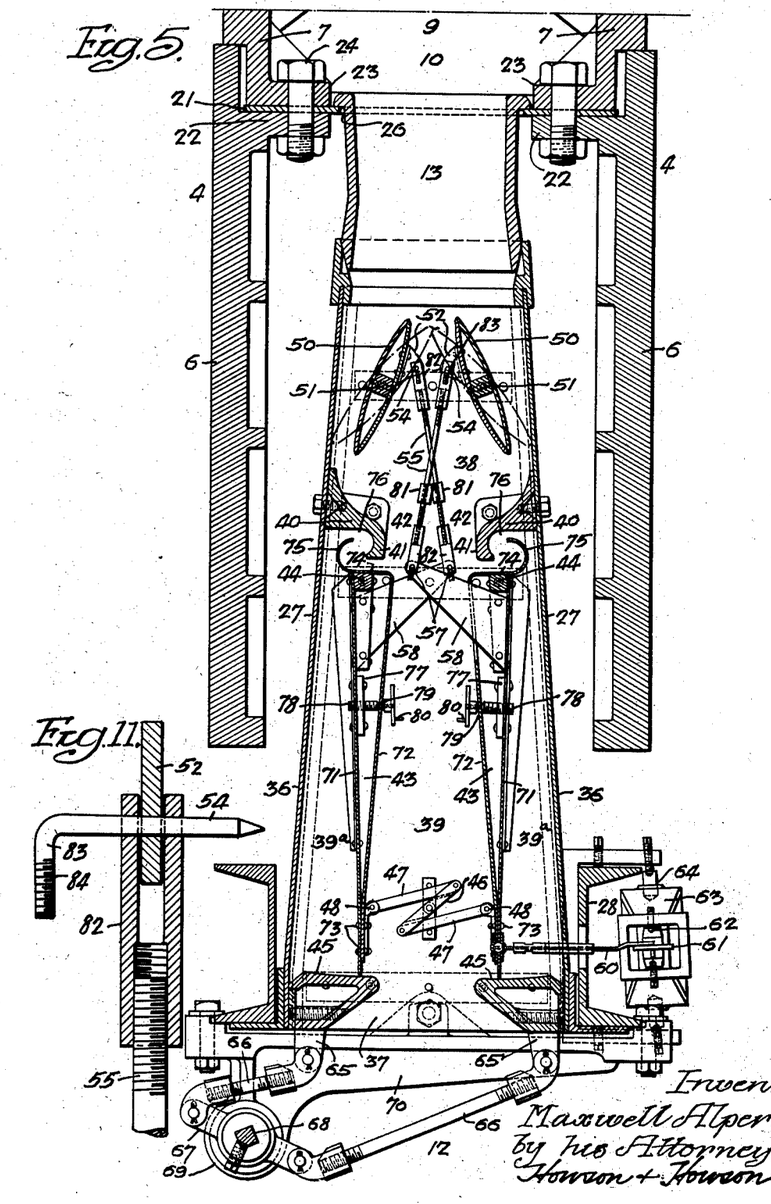
Fig. 5 is a transverse sectional elevation taken along the line 5—5 of Fig. 4, and illustrating the air control mechanism for one particular section of the fire bed.
Fig. 11 is a detail of the invention.
Figure 6:
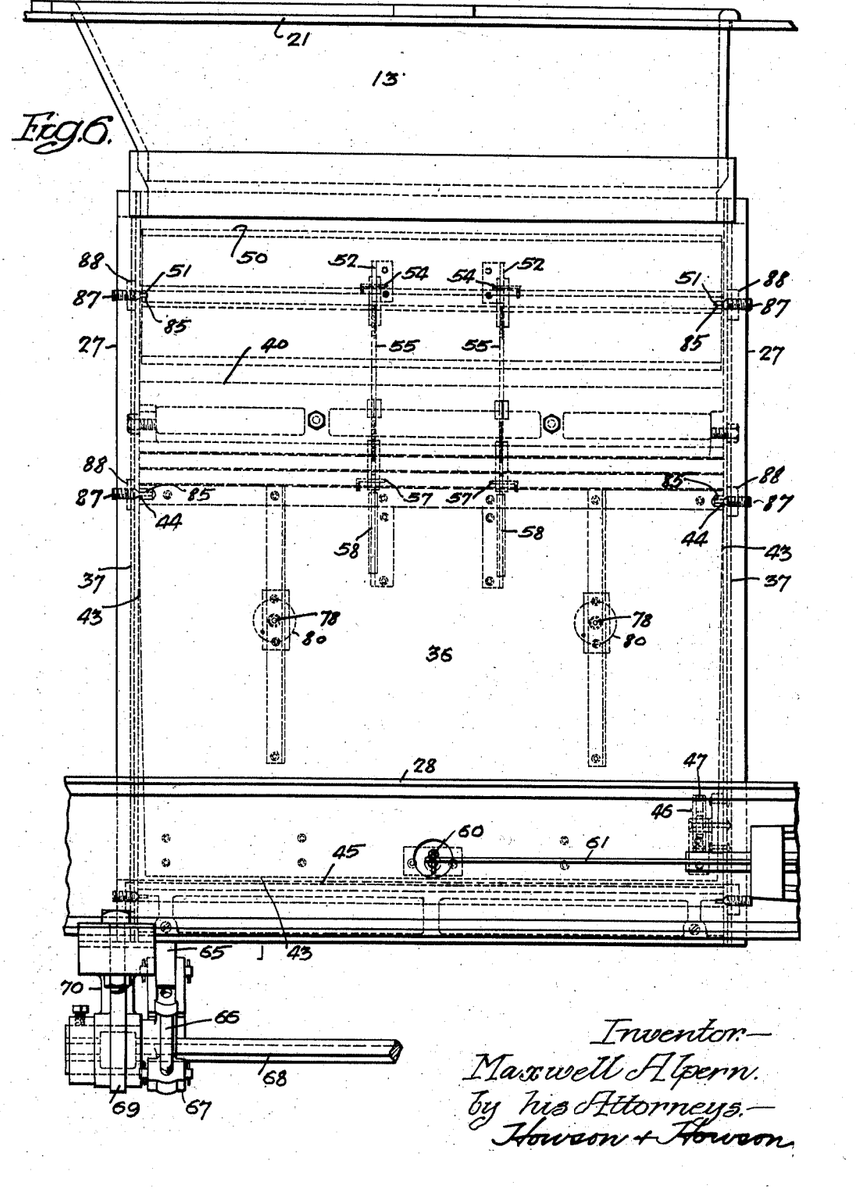
Fig. 6 is a side elevation of the control unit shown in Fig. 5.

Under normal operating conditions and with the proper amount of fuel overlying the tuyère units 7, uniformly throughout the bed of the fire, the elements of each of the control boxes 27 occupy positions substantially as shown in Fig. 5, and a uniform amount of air passes from the wind-box 12 through the chamber 39 between the motor elements 43, 43, the throat 42, the chamber 38, between the dampers 50, 50, through the nozzle 13 into the chamber 10, thence through the openings in the tuyère 7 and through the body of fuel overlying the tuyères, whereby proper combustion is obtained over the entire fire bed, the body of fuel offering a certain amount of resistance to the air passing therethrough.

Between the side walls 36, 36 and each motor elements 43- a supplemental chamber 39ᵃ is formed. Under the said normal operating conditions, the air pressure in the chambers 38, 39 and the two supplemental chambers 39ᵃ, 39ᵃ is substantially uniform, therefore, the motor elements 43, 43 assume a neutral position, substantially as illustrated in Fig. 5. The dampers 50, 50, being directly connected to the motor elements 43, 43, likewise assume a neutral position substantially as shown. When a spot in the fire bed burns through and the normal resistance to the normal air flow thereby reduced, the pressure in the chamber 38 is caused to drop below normal whereby the above mentioned increased flow of air between the wind-box and the tuyère chamber 10 begins. The increased flow of air in passing through the throat 42 in the control box 27 causes the air to be drawn from each of the supplemental chambers 39ᵃ over the top of the motor element 43, and under the bottom of the flange 41 of the rail 40. The drawing of the air from the supplemental chamber 39ᵃ reduces the air pressure therein to such an extent that the normal air pressure at the opposite side of each of the elements 43, 43 causes the said elements to turn on their pivots 44, thereby causing the dampers 50, 50 to turn on their pivots 51, 51, from the position shown in full lines to that shown in broken lines, whereby the passage of air from the chamber 38 to the air nozzle 13 is effectively reduced.

By reducing the flow of air to the nozzle 13, the flow of air through the tuyère openings is also reduced, and the excessive temperature otherwise obtained is effectively prevented.

The elements of the control box 27 also operate in a reverse order as follows: If the density of the fuel bed is increased over the nozzle 13, by the addition of new fuel, etc., the flow of air through the nozzle will be retarded by the increased resistance presented, which causes the pressure to build up in the chambers 39ᵃ to such an extent that the motor blades 43, 43 are operated in a reverse direction which effects a wider opening of the dampers 50, 50 permitting a greater flow of air through the nozzle 13 to the dense fuel bed thereover.

It will, therefore, be apparent that whenever a differential pressure is developed in the control box 27, the dampers 50, 50 will be inversely operated in accordance with resistance offered to the flow of air through the nozzle 13.

Each motor element 43 comprises a blade 71 to which the pivot bar 44 is secured. A relatively movable blade 72 is secured at 73 to the blade 71 and has a flange 74 overlying the pivot bar 44, said flange being curved upward at 75, said curved flange extending into a cavity 76 formed in the center rail 40.

A nut 77 is secured to the blade 71 and is adapted to receive the threaded end of an adjusting screw 78 which is provided with a groove 79 adapted to receive the movable blade 72, a crank 80 being provided by means of which the screw 78 may be turned and the upper edge of the blade 72 moved relative to the blade 71, for the purpose of determining the proper throat opening between the motor elements and consequently between the chambers 38 and 39.

The blades 72 may be adjusted relative to the blades 71 from the wind-box 12 of the furnace by inserting a rod upward therefrom into the chamber 39, the rod being provided with a suitable eye for engagement with the crank 80.

Adjustment of the rods 55, 55 and subsequently the relation between the motor elements 43, 43 and the dampers 50, 50 may also be effected from the wind-box 12, in a manner as above described, the rod employed being provided with a suitable aperture to engage the hexagonal portions 81 of the rods 55. The rods 55 are each provided at their opposite ends with forked heads 82 provided with threaded openings having right and left hand threads respectively, the rods 55 being provided with similarly formed threads, whereby the turning of the rods 55 effects a change in the relation between each motor element 43 and its respective damper 50.

The pivots 54, 54 and 57, 57 by means of which the rods 55, 55 are respectively connected to the damper lugs 52, 52 and the motor arms 58, 58, may be constructed in a manner illustrated in Fig. 11, wherein the pivot rod 54 is shown as having a depending arm 83 threaded as at 84, for engagement with a suitably threaded socket rod (not shown) which may be employed to remove or replace any of the pivot rods 54, 54 or 57, 57, from the wind-box of the furnace.

The pivots 44, 44 of the motor elements 43, 43 and also the pivots 51, 51 of the dampers 50, 50 may be formed by drilling the opposite ends of the said pivot bars 44, 44 and 51, 51 as at 85 for the reception of plain circular ends 86 of pivot screws 87 threaded into supporting bar 88 secured to the end plates 37 of the control box 27.

When the flow of air to any of the nozzles 13 is altered, it may be desirable, though not essential, to alter, in reverse order, the flow of air to the remaining nozzles of the particular tuyère bank to which these nozzles belong, and for this purpose I have provided means whereby the checking of one or more nozzles of the series contained in the tuyère bank will automatically increase the flow of air to the remaining nozzles, or vice versa, by means of the following mechanism.

Figures 8, 10:
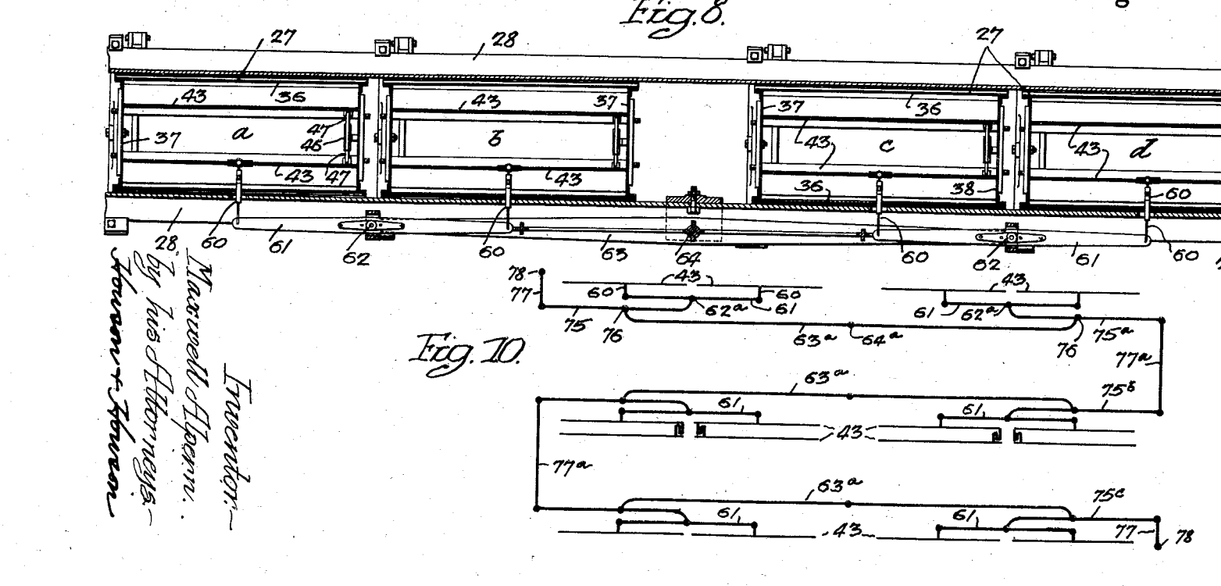
Fig. 8 is a sectional plan view taken along the line 8—8 of Fig. 3, illustrating the mechanism by which a series of the air control units are operatively connected, one with the other.
Fig. 10 is a diagrammatic view illustrating an arrangement of levers whereby the entire fire bed may be affected by the operation of my one single control unit.
Figure 9:
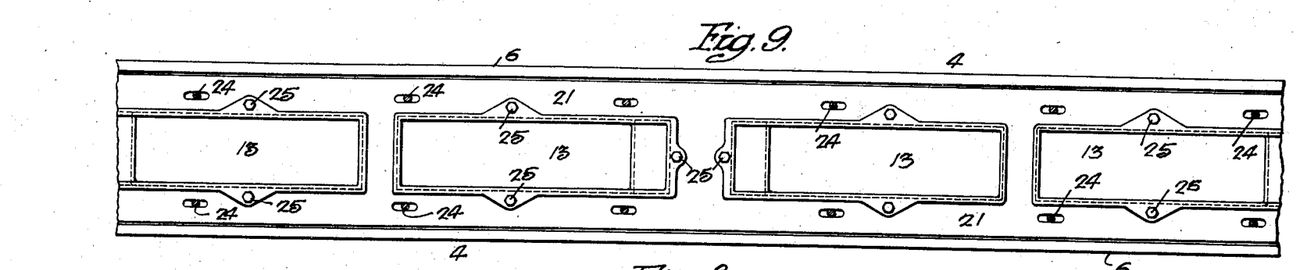
Fig. 9 is a sectional plan view taken along the line 9—9 of Fig. 4.

Upon reference to Fig. 8, it will be noted that one of the motor blades 43, of each pair, is operatively connected by means of a link 60 to one end of a lever 61. Each of the levers 61 is pivoted intermediate its ends, at a point 62, to one end of a main lever 63 which in turn is pivoted intermediate its ends, at a point 64, to one of the supporting beams 28.

For the purpose of illustration, I have designated the nozzle units in Fig. 8 as $a$, $b$, $c$ and $d$. Should the fuel bed be thin or tend to burn out in the spot overlying the unit $b$, for example, with a consequent operation of the motor blades 43 thereof, as described above, the outward movement of the motor blades 43 would have a tendency to rock the lever 61, and thereby cause the motor blades of the nozzle unit $a$ to move toward each other. It will be understood that the flow of air through the unit $a$, $c$ and $d$ is primarily controlled by the density of the fuel bed thereover, and the pressure upon the blades 43 thereof would vary accordingly. Therefore, the outward movement of the blades of the unit $b$ would cause the blades of the units $a$, $c$ and $d$ to move toward each other a distance varying in accordance with the variation of pressure on these blades, by means of the lever 61 being turned on its pivot 62, the blades 43 of the unit $a$ establishing a resistance to the inward movement of the end of the lever 61 connected thereto and this established resistance would cause the lever 63 to turn on its pivot 64 thereby moving the pivot 62 of the lever 61, lying intermediate the units $c$ and $d$, to move inward and by means of the lever 61 and links 60, 60 the pair of blades 43 in each of the units $c$ and $d$ would move toward each other, a distance substantially equal to the movement of the blades of the unit $a$, whereby the dampers 50, 50 of each of the units $a$, $c$ and $d$ would be caused to turn on their pivots, and thereby increase the distance intermediate their upper edges, permitting an increased flow of air from the respective chambers 38 to the nozzle 13 communicating therewith.

The operation described relative to the thinning or burning out of the fuel bed in that section of the fire bed controlled by the unit $b$ would be effective in a similar manner upon the remaining units of the series regardless of which one of the units should become operable in event of the fuel bed thinning or burning through in the section of the fire bed controlled by that particular unit.

It will be understood that the flow of air through each and every one of the control units is primarily controlled by the resistance offered by the bed of fuel overlying the particular section of the fire bed which that particular unit communicates with, and should the fuel bed overlying each of the units vary with respect to the other units the amount of air passing to that particular section of the fire would vary in accordance therewith.

Figure 7:
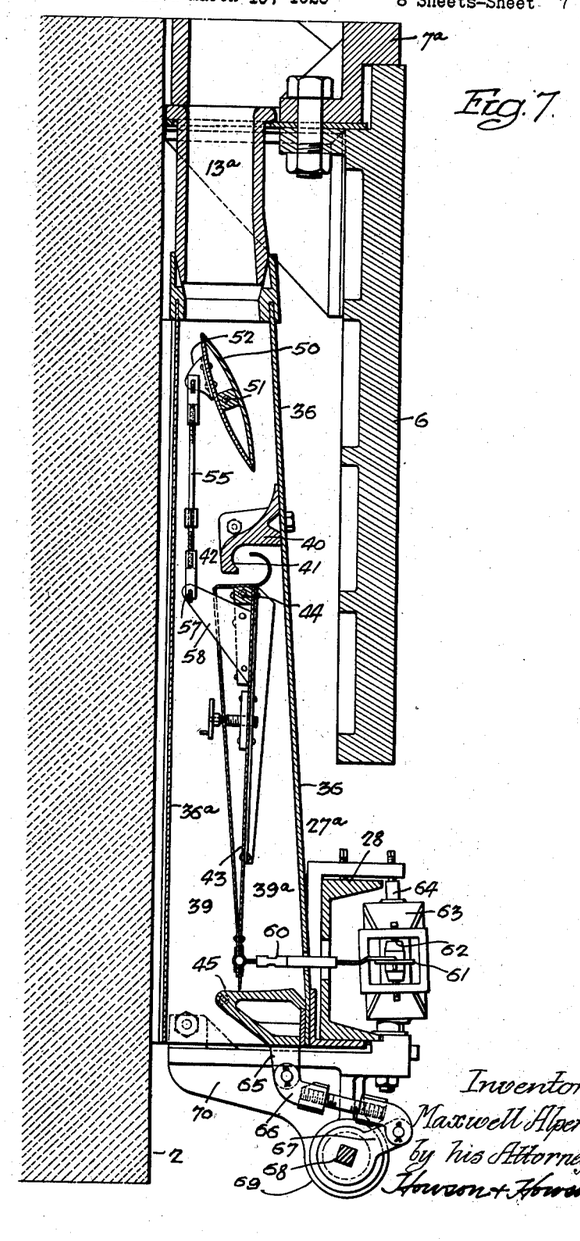
Fig. 7 is a transverse sectional elevation taken along the line 7—7 of Fig. 2, and illustrating a control unit for another particular section of the fire bed.

As illustrated in Figs. 2 and 7, the tuyère bank, immediately adjacent each side wall 2, 2 of the furnace, is composed of half section units $7^a$, $7^a$. In accordance with the half section tuyère units, the control box $27^a$, therefore, likewise contains but a single motor blade 43 and a single damper 50 which cooperates with a side wall $36^a$ to reduce the air flow through the control box $27^a$, otherwise the operation of the half section is substantially similar to the operation of the complete units.

In each control box 27, $27^a$ the lower rail 45 thereof is pivoted in the end walls 38, 38 thereof, for the purpose of permitting the rail to be turned or dumped, to remove any ash or siftings from the upper side thereof, which may accumulate thereon. For the purpose of dumping the rails 45, each rail is provided with a lug 65 connected by means of a rod 66 with opposite ends of a lever 67 secured to a shaker rod 68, pivotally mounted in suitable bearings 69 formed on brackets 70 secured to the supporting beams 28, 28. The shaker rod 69 extends beyond the front wall of the furnace and is provided with a crank 70$^a$.

In Fig. 10, I have illustrated diagrammatically a method of connecting the motor blades 43 of all the control boxes 27 for the entire fire bed, in such a manner that a variation in the air flow through any of the control boxes thereof will automatically affect the flow in the remainder of the boxes in a reverse order. As illustrated in said figure, the motor blades 43 of each pair of adjacent control boxes are connected to the lever 61 in the same manner as illustrated in Fig. 8. One lever 61 of the side tuyère bank is pivoted to a lever 75 at 62$^a$, the lever 75 being pivoted at 76 to one end of the main balance lever 63$^a$, pivoted at 64$^a$ to the beam 28 in the manner above noted. The opposite end of the lever 75 is connected by a link 77 to a stationary pivot 78. The other lever 61 of the side tuyère bank is connected in the manner above noted with the following exception the lever 75$^a$ is connected by a link 77$^a$ to the lever 75$^b$ of the control box of the first intermediate tuyère bank as illustrated, and so on throughout the entire fire box, the last lever 75$^c$ of the opposite side of the tuyère bank being anchored at 78 in a manner similar to the link 75 at the other side of the fire-box. By interconnecting the control boxes of the several tuyère banks, any movement of one of the motor blades will affect the position of each of the other blades throughout the stoker and subsequently the damper which it controls with a consequent adjustment of the amount of air passing through that particular control box.

I claim:

1. In a fluid system having a series of ducts, a device for automatically throttling the flow of fluid in said ducts in inverse proportion to the resistance offered to the flow in the respective ducts of the series adapted to maintain a constant flow from the ducts of the series.

2. In a fluid system having a series of ducts in each of which the flow is subject to variable resistance, a device for automatically throttling the flow of fluid in said ducts in inverse proportion to the resistance offered to the flow in the respective ducts of the series and adapted to maintain a constant aggregate flow from the ducts of the series.

3. In a fluid system having a series of ducts in each of which the flow is subject to variable resistance, a device for automatically throttling the flow of fluid in said ducts in inverse proportion to the resistance offered to the flow in the respective ducts of the series and adapted to maintain a constant aggregate flow from the ducts of the series in any predetermined ratio to the resistance offered.

4. In a fluid system having a series of ducts, a device for automatically throttling the flow of fluid in said ducts in inverse proportion to the resistance presented to the flow in the ducts of the series, comprising a throttle for each of said ducts, operable by the resistance presented to the flow in the respective ducts, and means for interconnecting the series of throttles whereby a variation of any of said throttles will inversely vary the other throttles of the series, for maintaining a constant aggregate flow from the series of ducts.

5. In a fluid system, a control device comprising a damper chamber; a central chamber and a supplemental chamber at either side of said central chamber; a motor intermediate the central chamber and each of the respective supplemental chambers and a pair of dampers in said damper chamber respectively and co-operatively connected to the said motors.

6. In a fluid system, a control device comprising a damper chamber, a central chamber, a supplemental chamber adjacent each opposite side of said central chamber; a motor blade intermediate the central chamber and each of the respective supplemental chambers; a pair of dampers in the damper chamber co-operatively and respectively connected to said motor blades; and means for synchronizing the operation of said motor blades.

7. In a fluid system, a control device comprising an upper damper chamber, a central chamber below said damper chamber, a supplemental chamber adjacent each of the respective sides of said central chamber, a throat formed between said central and said damper chamber, and a passage communicating with said throat and each of said supplemental chambers; a motor blade intermediate the central chamber and each of the supplemental chambers operable by a differential pressure created in said central and supplemental chambers; and a damper co-operatively and respectively connected to each of said motor blades.

8. In a fluid system, a control device comprising a damper chamber, a central chamber, supplemental chambers, a throat formed between said central and said damper chamber, and a passage communicating with said throat and each of said supplemental chambers; a motor blade intermediate the central chamber and each of the supplemental chambers operable by the normal air pressure in the central chambers; a damper co-operatively connected to each of said motor blades; and means for varying the area of said throat.

9. In a fluid system, a control device comprising longitudinal side walls and end walls; an upper rail secured to each longitudinal wall intermediate the top and bottom edges thereof whereby the interior of the control device is horizontally divided into an upper chamber and a lower chamber; a throat formed between said chambers by said rails; a pair of lower rails adjacent to and parallel with the bottom edges of said side walls; motor blades pivoted to said end walls, spaced apart from said side walls and extending longitudinally of the control device between said upper and lower rails, whereby the lower chamber is divided into a central chamber and a supplemental chamber adjacent each side thereof; and a pair of dampers in said upper chamber co-operatively and respectively connected to said motor blades.

10. In a fluid system, a control device comprising longitudinal side walls and end walls; an upper rail secured to each longitudinal wall thereby forming an upper chamber and a lower chamber in said box; a throat formed between said chambers by said rails; a pair of lower rails adjacent to and parallel with the bottom edges of said side walls; motor blades pivoted to said end walls, spaced apart from said side walls and extending longitudinally of said control device between said upper and lower rails, whereby the lower chamber is divided into a central chamber and a supplemental chamber adjacent each side thereof; auxiliary blades on said motor blades and movable with respect thereto whereby a supplementary throat is formed between the motor blades; a passage between said throat and said supplemental chambers; and a pair of dampers in said upper chamber co-operatively and respectively connected to said motor blades.

11. In a fluid system, a control device comprising longitudinal side walls and end walls; an upper rail secured to each longitudinal wall thereby forming an upper chamber and a lower chamber in said box; a throat formed between said chambers by said rails; a pair of lower rails adjacent to and parallel with the bottom edges of said side walls; motor blades pivoted to said end walls, spaced apart from said side walls and extending longitudinally of said control box between said upper and lower rails, whereby the lower chamber is divided into a central chamber and a supplemental chamber adjacent each side thereof; auxiliary blades on said motor blades and movable with respect thereto whereby a supplementary throat is formed between the motor blades; a flange on each upper rail; a flange on each motor blade co-operating with said rail to form a passage between said throat and said supplemental chambers; and a pair of dampers in said upper chamber co-operatively and respectively connected to said motor blades.

12. In a fluid system, a control device comprising side walls and end walls a motor unit comprising a pair of motor blades longitudinally pivoted adjacent their upper edges in the end walls of the control device by means of a pivot bar secured to each blade; an auxiliary blade secured to each motor blade adjacent its edge opposite the pivot bar, and extending to the upper edge of said blade whereby a throat is formed between the upper edges of the motor blades; a horizontally extending flange on each auxiliary plate extending over the pivot bar of each motor blade; and means for moving the auxiliary blades relative to the motor blades, for controlling the area of said throat.

13. In a fluid system, a control device comprising longitudinal side walls and end walls; an upper rail secured to each longitudinal wall intermediate the top and bottom edges thereof whereby the interior of the control device is horizontally divided into an upper chamber and a lower chamber; a pair of lower rails pivotally mounted adjacent to and parallel with the bottom edges of said side walls; motor blades pivoted to said end walls, spaced apart from said side walls and extending between said upper and lower rails, whereby the lower chamber is divided into a central chamber and a supplemental chamber adjacent each side thereof; a passage formed between each upper rail and each motor blade; a bracket secured to said control box; a lever pivoted intermediate its ends to said bracket; a lug on each lower rail and links connnecting said lower rail lugs to the opposite ends of said lever, whereby the lower rails may be turned to dump any foreign matter which may accumulate thereon in said suppplemental chambers.

14. In a fluid system including a series of ducts, a device in each duct automatically throttling the flow of fluid in the duct in inverse proportion to the resistance offered to said flow and means interconnecting said devices whereby the throttling operation of any of said devices is accompanied by a reverse throttling in another device or other devices.

15. In a fluid system including a series of ducts, a device in each duct automatically throttling the flow of fluid in the duct in inverse proportion to the resistance offered to said flow, and means interconnecting said devices whereby motion of any thereof is accompanied by reverse operation of another or other devices.

16. In a fluid system including a plurality of ducts, a device in each duct for automatically throttling the flow of fluid therethrough, including a motor adapted to be actuated by a pressure differential created in said device by the resistance offered to flow, and means interconnecting the motors of said devices whereby a movement of any of said motor is accompanied by a reverse movement of a further motor or motors.

17. In a fluid system including a plurality of ducts, a throttle for each duct and means interconnecting said throttles for varying the flow in individual ducts while maintaining a uniform aggregate flow in the ducts.

18. In a fluid system including a series of ducts, a throttle in each duct and a motor therefor, and means interconecting said motors whereby individual motors may operate through their throttles to vary the flow of individual ducts while maintaining a uniform aggregate flow through the ducts.

MAXWELL ALPERN.